United States Patent [19]

Watson

[11] 4,182,199

[45] Jan. 8, 1980

[54] POWER TRANSMISSION GEARBOX

[75] Inventor: Norman F. Watson, Chipperfield, England

[73] Assignee: Stonefield Developments, (Paisley) Limited, Paisley, Scotland

[21] Appl. No.: 789,003

[22] Filed: Apr. 19, 1977

[30] Foreign Application Priority Data

Apr. 20, 1976 [GB] United Kingdom ............... 15922/76

[51] Int. Cl.² ............................................. F16H 57/02
[52] U.S. Cl. .................................................. 74/606 R
[58] Field of Search .............. 74/11, 15.2, 15.8, 15.82, 74/15.84, 15.86, 711, 606 R, 606 A; 180/44 R, 49

[56] References Cited

U.S. PATENT DOCUMENTS

| | | | |
|---|---|---|---|
| 1,746,871 | 2/1930 | Rushton | 74/606 |
| 2,314,833 | 3/1943 | Keese | 180/44 R |
| 2,329,916 | 9/1943 | Lamb et al. | 74/700 |
| 2,344,388 | 3/1944 | Bixby | 180/49 |
| 2,851,115 | 9/1958 | Buckendale | 180/44 R |
| 3,175,283 | 3/1965 | Baudras-Chardigny | 74/606 |
| 3,241,628 | 3/1966 | Thomas | 74/15.8 |
| 3,378,093 | 4/1968 | Hill | 180/44 R |
| 4,022,084 | 5/1977 | Pagdin et al. | 74/711 |
| 4,050,328 | 9/1977 | Romick | 74/711 |
| 4,108,021 | 8/1978 | MacAfee et al. | 74/606 R |

FOREIGN PATENT DOCUMENTS 938193 12/1955 Fed. Rep. of Germany ............ 74/15.2

*Primary Examiner*—Samuel Scott
*Assistant Examiner*—William R. Henderson
*Attorney, Agent, or Firm*—Charles E. Brown

[57] ABSTRACT

A power transmission gearbox comprises an input shaft, output shaft and power take off shaft mounted in a housing, the housing being adapted for connection to the input and output shafts in two positions in each of which the power take off shaft is mounted in a different position relative to the input and output shafts while the input and output shafts occupy the same relative positions. The gearbox allows the power take off shaft to be mounted in a "high" or "low" position on a vehicle.

11 Claims, 9 Drawing Figures

POWER TRANSMISSION GEARBOX

This invention relates to power transmission gearboxes.

It is convenient to include in the power transmission systems of road vehicles a gearbox which carries a power take-off shaft which may be used to drive ancillary equipment.

The optimum position in the vehicle for the location of the power take-off shaft will depend upon the nature of the ancillary equipment with which it is intended to be used. Consequently, where a vehicle may be used with a wide variety of ancillary equipment, it would be desirable for the manufacturer to provide alternative locations for the power take-off shaft.

According to the present invention there is provided a power transmission gearbox comprising a housing, an input shaft, an output shaft and a power take-off shaft rotatably mounted in the housing, the housing being adapted for connection to the input and output shafts in two positions in each of which the power take-off shaft is mounted in a different position relative to the input and output shafts, the relative positions of the input and output shafts being unaltered as between the two positions of the housing.

Thus, the same gearbox may be used to provide two alternative locations of the power take-off shaft.

In general, the input and output shafts will be rotatable about parallel axes and the housing is preferably so shaped that the power take-off shaft may be positioned on opposite sides of the common plane of the axes of the input and output shafts. Preferably, the housing is adapted for connection to the input and output shafts in obverse and reverse positions.

Although the housing may be provided on each side with separate sets of mountings for the bearings of both the output and the input shafts, to facilitate assembly of the gearbox with the housing in both positions, the input and output shafts are preferably rotatably mounted in bearing housings which are interchangeably mounted on opposite sides of the gearbox housing.

Lubrication of the gearbox may be conveniently effected in both operating positions of the housing by so shaping the housing that it defines an oil sump in both its possible working positions.

The drive between the input, output and power take-off shafts may be achieved by any suitable mechanical arrangement, for example by directly engaging gear wheels. Preferably however the input, output and power take-off shafts are all driven by respective drive sprockets connected together by a drive chain.

Desirably, one or more of the input, output and power take off shafts, preferably the output shaft, is mounted adjustably in the housing so that the spacings between the shafts can be increased to accommodate water in the drive chain. The adjustment of the shaft may be achieved conveniently by bolting the bearing housing of the adjustable shaft to the gearbox housing using a set of bolt holes arranged at equal intervals around a circle disposed eccentrically with respect to the axis of the adjustable shaft. By bolting the bearing housing on to the gearbox housing in its different rotational positions, the radial spacing between the adjustable shaft and the remaining shafts can be increased or decreased.

Desirably the drive between the output shaft and its drive sprocket may be disconnected so that the power take-off shaft may be driven by the input shaft independently of the output shaft. The drive between the power take-off shaft and its drive sprocket is preferably also disengageable so that the power take-off shaft may be brought to rest while the output shaft is being driven.

The power transmission gearbox may be incorporated in any type of vehicle. The gearbox will in general however be most useful with heavy-duty vehicles which are also normally provided with four-wheel drive transmission systems. In such systems a gearbox is required to split the drive from the engine between the front and rear wheels. The output shaft is therefore preferably adapted for connection to two drive trains extending in opposite directions from the gearbox.

One of the drive trains may then be used to transmit power to the front wheels of the vehicle, and the other to transmit power to the rear wheels.

When a vehicle turns, its rear wheels may rotate at a different speed from the front wheels, particularly on vehicles having a long wheel-base. Consequently the four-wheel drive transmission should include a differential gear between the two drive trains. Preferably therefore, the housing of the gearbox of the invention is removably mounted on a differential gear assembly, for example an epicyclic gear train, which transmits drive from the drive sprocket of the output shaft to a drive shaft which is coaxial with the output shaft, the drive shaft and the output shaft being adapted to transmit power from the gearbox in opposite directions.

A preferred gearbox in accordance with the invention will now be described, by way of example only, with reference to the accompanying drawings, in which:

FIGS. 1 to 4 illustrate a gearbox 1 suitable for incorporation in a four-wheel drive transmission system.

Figure 1:
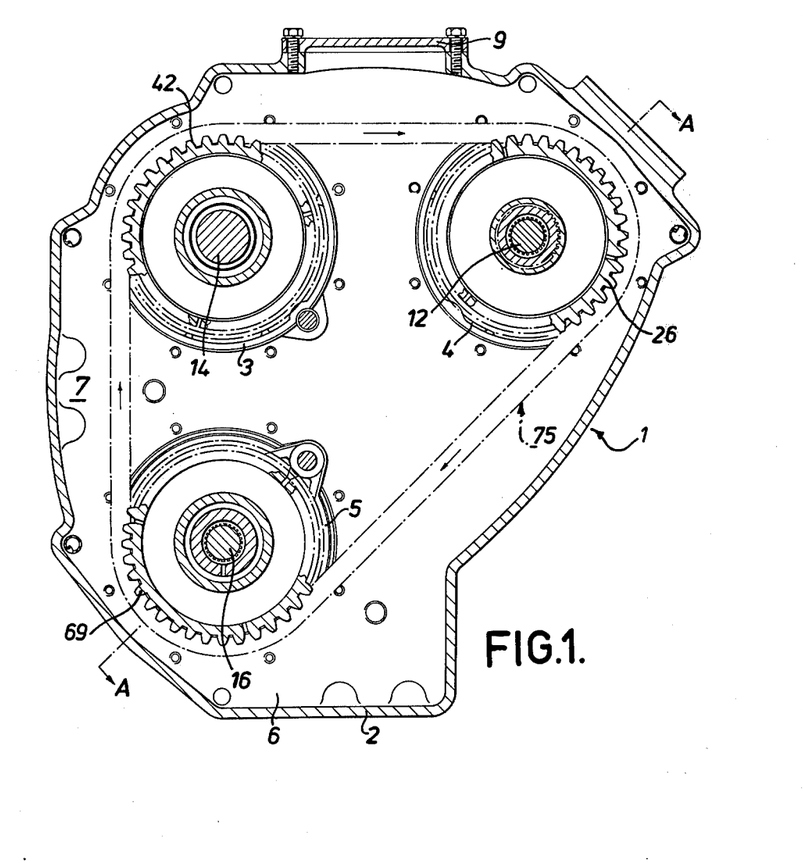
FIG. 1 is a transverse cross-section of the gearbox, taken along line B—B of FIG. 2.

The gearbox 1 comprises a housing 2 which defines three apertures 3, 4, 5 and two cavities 6, 7 which act as sumps for lubricating oil, as will be described later. The housing 2 includes a mounting bracket 8, and an inspection port which is closed by a cover 9.

Figure 2A:
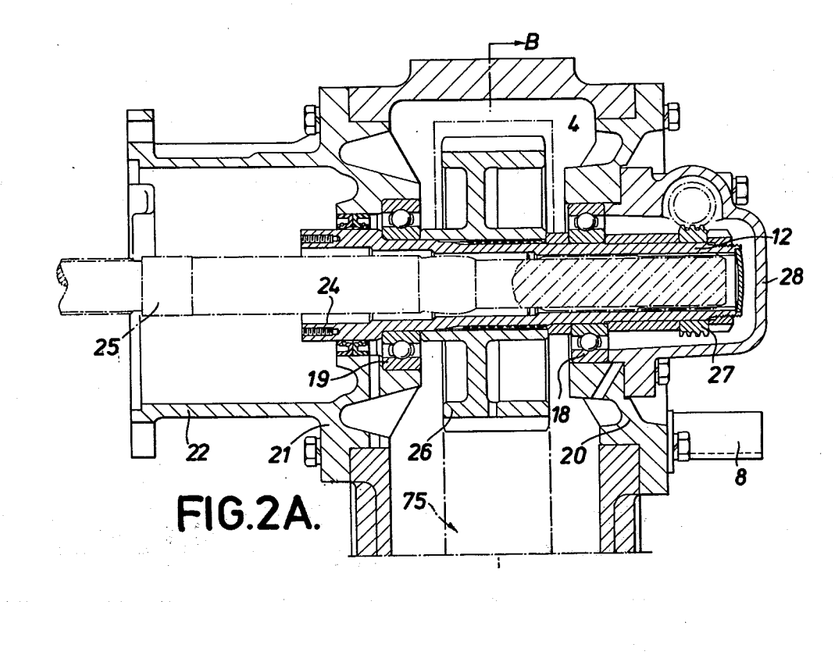
FIGS. 2A and B form a cross-section of the gearbox taken on line A—A of FIG. 1.
Figure 2B:
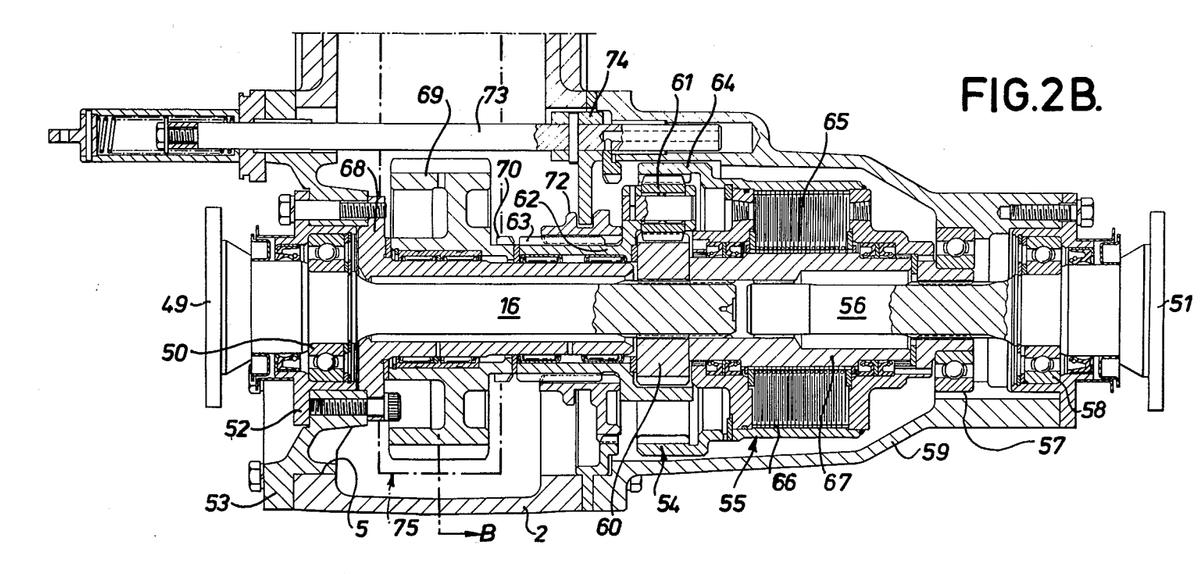
Figure 3:
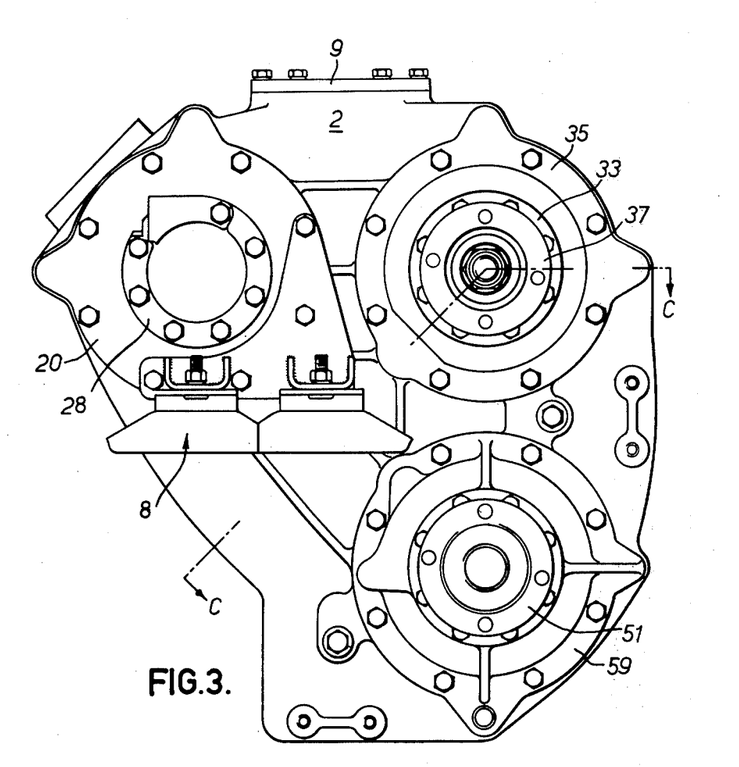
FIG. 3 is an end view of the gearbox of FIG. 1 and 2.

An input shaft 12, a power take-off shaft 14 and an output shaft 16 are mounted for rotation about parallel axes in respective ones of the apertures 3, 4 and 5 in the housing. As best seen in FIG. 2, the input shaft 12 is rotatably mounted in one of the apertures 4 by means of bearings 18, 19, which are themselves mounted in housings 20, 21 bolted to the housing 2. The bolt holes in both the bearing housings 20, 21 are arranged in identical configurations so that the output shaft can be mounted in a reversed position in the apertures 3 as compared with the position illustrated in FIG. 2. One of the bearing housings 21 includes a flanged casing 22 which extends away from one end of the input shaft 12. The input shaft 12 includes a stepped axial bore 24 which is splined at its narrower end to receive a splined drive shaft 25 which may be inserted into the input shaft 12 through the casing 22. The external surface of the input shaft 12 is also splined and carries a drive sprocket 26 which is located within the housing 2 and a worm gear 27 located outside the housing 2 which is used to drive a speedometer gear (not shown). The worm gear 27 and the speedometer gear are housed in a cover 28 bolted to the bearing housing 20.

Figure 4:
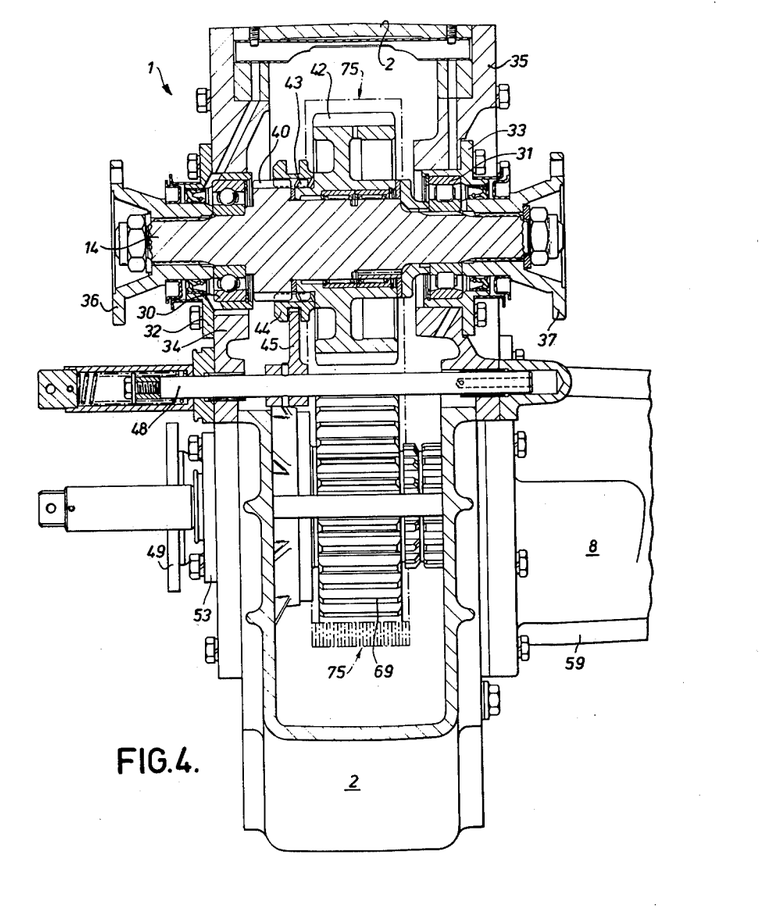
FIG. 4 is a cross section of the gearbox taken along line C—C of FIG. 3.

As best seen in FIG. 4, the power take-off shaft 14 is rotatably mounted in a second one of the apertures 4 by means of bearings 30, 31 which are themselves mounted in housing 32, 33 bolted to cover plates 34, 35 which are in turn bolted to the housing 2. The similar configurations of the bolt holes in the covers 34, 35 and the housing 2 enable the power take-off shaft 14 to be reversed in the housing 2. Each end of the power take-off shaft is splined and carries a companion flange 36, 37 by means of which either end of the power take-off shaft 14 may be coupled to a member to be driven.

Within the housing 2, the external surface of the power take-off shaft 14 carries a ring of gear teeth 40 integral with the shaft 14. A drive sprocket 42 is rotatably mounted on the power take-off shaft 14 adjacent the ring of gear teeth 40 and carries a similar ring of gear teeth 43. An internally toothed selector ring 44 is also mounted on the power take-off shaft 14 and is slidable by a selector fork 45 between an engaged position, illustrated in FIG. 2B, in which it simultaneously meshes with the rings of gear teeth 40, 43 on the power take-off shaft 14 and the drive sprocket 42, and a disengaged position in which the selector ring meshes only with the ring of gear teeth on the power take-off shaft 14. The selector fork 45 may be operated by a selector rod 48 axially reciprocable in the housing 2 thus enabling the drive sprocket to be engaged and disengaged from the power take-off shaft 14.

One end of the output shaft 16 carries a companion flange 49 and is rotatably mounted in the third of the apertures 5 by means of bearings 50 which are themselves mounted in a housing 52 bolted to a cover plate 53 which is in turn bolted to the housing 2. The other end of the output shaft 16 is connected through an epicyclic gear train indicated generally at 54, and a slipping disc clutch 55 to a drive shaft 56 which also carries a companion flange 51.

In an alternative embodiment (not shown) a further two speed epicyclic gear train is interposed between the gear train 54 and the other end of the output shaft allowing either a direct connection or a step-down gear reduction between the output shaft 16 and the epicyclic gear train 54.

The drive shaft 56 is rotatably mounted in bearings 57, 58 which are themselves mounted in a cover 59 for the epicyclic gear train 54 and the clutch 55, the cover 59 being bolted to the housing 2. The positions of the bolt holes in the cover 59 correspond to those in the cover plate 53 so that the output shaft 16, gear train 54, clutch 55 and drive shaft 56 may be reversed in the housing 2 as compared with the orientation shown in FIG. 2.

The epicyclic gear train 54 is of conventional construction and allows differential rotation of the drive shaft 56 relative to the output shaft 16. The gear train comprises a sun gear 60 splined onto the end of the output shaft 16, three planetary gears, one of which is indicated at 61, meshing with the sun gear 60 and rotatably mounted in a carrier 62 one end of which is rotatably mounted on the end of a hollow lay shaft 68 fixed within the housing 2 around the output shaft 16. The end of the carrier 62 mounted on the output shaft 16 is also provided with an external ring of gear teeth 63. The planet wheels also mesh with an internally toothed annulus 64 which is splined to the drive shaft 56. The annulus 64 also carries one set 65 of clutch plates of the splipping disc 55, which plates are interleaved with a further set of plates 66 carried by a bush 67 splined onto the end of the output shaft 16. The void between the clutch plates 65 and 66 is filled with a conventional slipping plate clutch fluid which has a viscosity which increases on the application of shear forces.

A drive sprocket 69 rotatably mounted on the lay shaft 68 carries a ring of gear teeth 70 which may be coupled to the external ring of teeth 63 on the end of the carrier 62 by means of a selector ring 72, slidably mounted on the end of the carrier 62 for movement between a disengaged position as illustrated in FIG. 2, in which the teeth of the selector ring mesh only with the external ring of teeth 63 on the carrier 62, and an engaged position in which the teeth of the selector ring 72 also mesh with the ring of teeth 70 on the drive sprocket 69. The selector ring is operable by a selector rod 73 mounted for axially reciprocation in the housing 2, and a selector fork 74, thus enabling the output and drive shafts 16 and 56 to be disconnected from the drive sprocket 69.

The drive sprockets 26, 42 and 69 for the input, power take-off and output shafts are connected together by a drive chain 75. Wear in this drive chain can be compensated for by increasing the distance between the output and drive shafts 16, 56, and the power take-off and input shafts 12, 14, by securing the cover plate 53 and the cover 59 in alternative rotational positions with respect to the housing 2.

Figure 5:
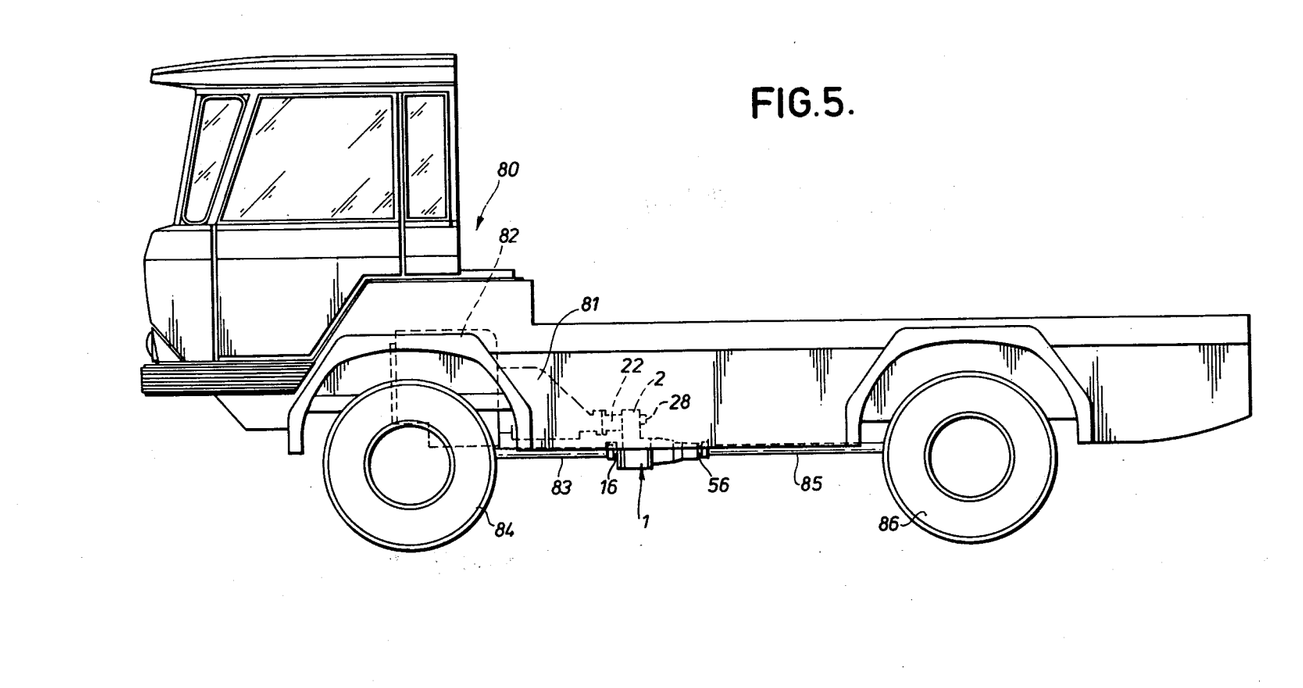
FIG. 5 is a side elevation of a lorry having a transmission system which incorporates the gearbox of FIGS. 1 to 4, and FIGS. 6A, B and C are diagrams, illustrating the three operating conditions of the gearbox.

FIG. 5 illustrates the gearbox 1 when installed in a vehicle 80. The gearbox 1 is mounted in the vehicle 80 by means of the mounting bracket 8. The flanged casing 22 projects forwardly and is connected to a similar casing on a speed-change gearbox 81 driven by the engine 82 of the vehicle, an output shaft from the speed change gearbox being coupled directly to the input shaft 12. The output shaft 16 is coupled by a propeller shaft 83 to the front wheels 84, and the drive shaft 56 is coupled by a propeller shaft 85 to the rear wheels 86.

When viewed from the front of the vehicle, the housing 2 of the gearbox 1 occupies the configuration illustrated in FIG. 1, the power take-off shaft 14 lying to the left of and above the common plane of the axes of the input and output shafts 12 and 16. In this position lubricating oil collects in the cavity 6 adjacent the output shaft 16 and ensures that the drive chain 75 is lubricated.

In use, while the vehicle is moving, the selector ring 44 will normally be in its disengaged position, and the selector ring 72 will be in the engaged position. The input shaft 12 is rotated by the output shaft of the speed-change gearbox 81, and the drive chain 75 rotates the drive sprockets 26, 42 and 69 of the power take-off, input and output shafts 14, 12 and 16. Since the selector ring of the power take-off shaft 14 is disengaged the power take-off shaft 14 remains stationary.

The rotary movement of the drive sprocket is transmitted by the selector ring 72 to the carrier of the epicyclic gear train 64 and thence by the planet gears 61 to the sun gear 60, thus causing the output shaft 16 to rotate. The annulus 64 is also rotated causing the drive shaft 56 to rotate. Differential rotation between the front and rear wheels of the vehicle is accommodated by the epicyclic gear train 64. The differential rotation also causes the two sets of plates in the clutch 55 to rotate relative to each other, thus agitating the clutch fluid. Continued agitation such as occurs when the rear wheels skid, however increases the viscosity of the fluid to such an extent that a direct driving connection is established between the output and drive shafts 16, 56 thus reestablishing full four-wheel drive.

In order to engage the power take-off, the vehicle is halted and the engine is stopped, the selector rings 72 and 44 are disengaged and engaged respectively. The drive chain 75 and drive sprocket 42 then transmits rotary movement of the input shaft to the power take-off shaft 14.

By engaging the selector rings 72 and 44 simultaneously, the power take-off shaft may be rotated while the vehicle is moving.

In view of the fact that the covers 20, 21, 34, 35, 53 and 59 in which the bearings of the input shaft 12, the power take-off shaft 14, the output shaft 16 and the drive shaft 56 are respectively mounted are interchangeable between the obverse and reverse sides of the housing 2, the gearbox 1 can be assembled in an alternative configuration in which the housing 2 is reversed but the relative locations of the input, output and drive shafts 12, 16 and 56 are unaltered. The reversed position is obtained by rotating the housing 2 through 180° about the line A—A in FIG. 1 so that the power take-off shaft 14 is located beneath and to the right hand side of the common plane of the axes of the input and output shafts 12 and 16 as illustrated in FIG. 1. In this reversed position, lubricating oil collects in the cavity 6, and still effects adequate lubrication of the gearbox.

Figure 6A:
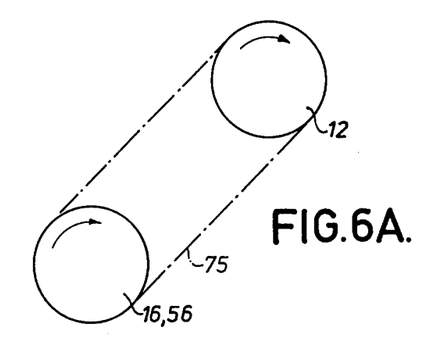
Figures 6B, 6C:
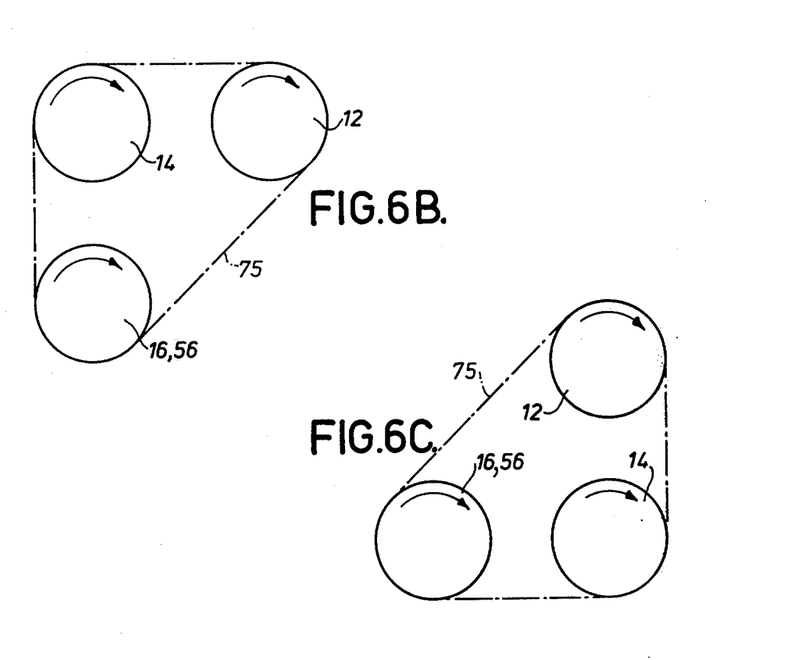

FIGS. 6A to C illustrates the alternative operating conditions of the gearbox. With the power take-off shaft disengaged, the relative dispositions of the input, output and drive shafts 12, 16, 56 are as illustrated in FIG. 6A. When the gearbox is assembled with the housing 2 in this obverse position, as illustrated in FIG. 1 to 4 of the drawings, the power take-off shaft 14 is positioned above the common plane of the axes of the input, output and drive shafts 12, 16, 56 as seen in FIGS. 6B. When the gearbox is assembled with the housing 2 in the reverse position, the power take-off shaft is positioned below the common plane of the axes of the input, output and drive shafts 12, 16, 56 as seen in FIG. 6C. In all three operating conditions the relative dispositions of the input, output and drive shafts 12, 16, 56 are unaltered.

What we claim is:

1. A power transmission gearbox comprising a housing; first mounting means mounting within said housing an input shaft, an output shaft and a power take-off shaft in a triangular pattern and with said input shaft and said output shaft lying in a plane sloping with respect to both the vertical and the horizontal; and second mounting means for selectively mounting said housing in first and second positions rotated end to end relative to one another about an axis lying in said plane and extending normal to said input shaft and said output shaft with the relative positions of said input shaft and said output shaft being unchanged and with said power take-off shaft being selectively in an upper position and a lower position in said housing.

2. A gearbox according to claim 1 wherein the two positions of the power take-off shaft are located on opposite sides of the common plane of the axes of the input and output shafts.

3. A gearbox according to claim 1 wherein said first mounting means include the input and output shafts being rotatably mounted in bearings which are supported in bearing housings which are interchangeably mounted on opposite sides of the housing.

4. A gearbox according to claim 1 wherein the housing has means defining an oil sump in each of its two working positions.

5. A gearbox according to claim 1 wherein the input, output and power take-off shafts are driven by respective drive sprockets which are connected by a drive chain.

6. A gearbox according to claim 5 including means for disengaging the output shaft from its drive sprocket.

7. A gearbox according to claim 5 including means for disengaging the power take-off shaft from its drive sprocket.

8. A gearbox according to claim 1 wherein the housing is removably mounted on a differential gear assembly which transmits drive from a drive sprocket of the output shaft to the output shaft and to a drive shaft coaxial with the output shaft, the output and drive shafts being arranged to transmit power in from the gearbox in opposite directions.

9. A gearbox according to claim 8 wherein the differential gear assembly is an epicyclic gear train.

10. A gearbox according to claim 1 wherein said first means includes means for facilitating rotation of each of said input shaft and said output shaft end for end within said housing.

11. A gearbox according to claim 1 wherein said housing has means defining a oil sump in each of said rotated positions.

* * * * *